Feb. 24, 1942.   R. MORGAN ET AL   2,274,557
ELECTRIC GAUGE
Filed July 10, 1940   2 Sheets-Sheet 1

INVENTORS
Raymond Morgan
Rembrandt D. Summers
by Howson & Howson,
Attys

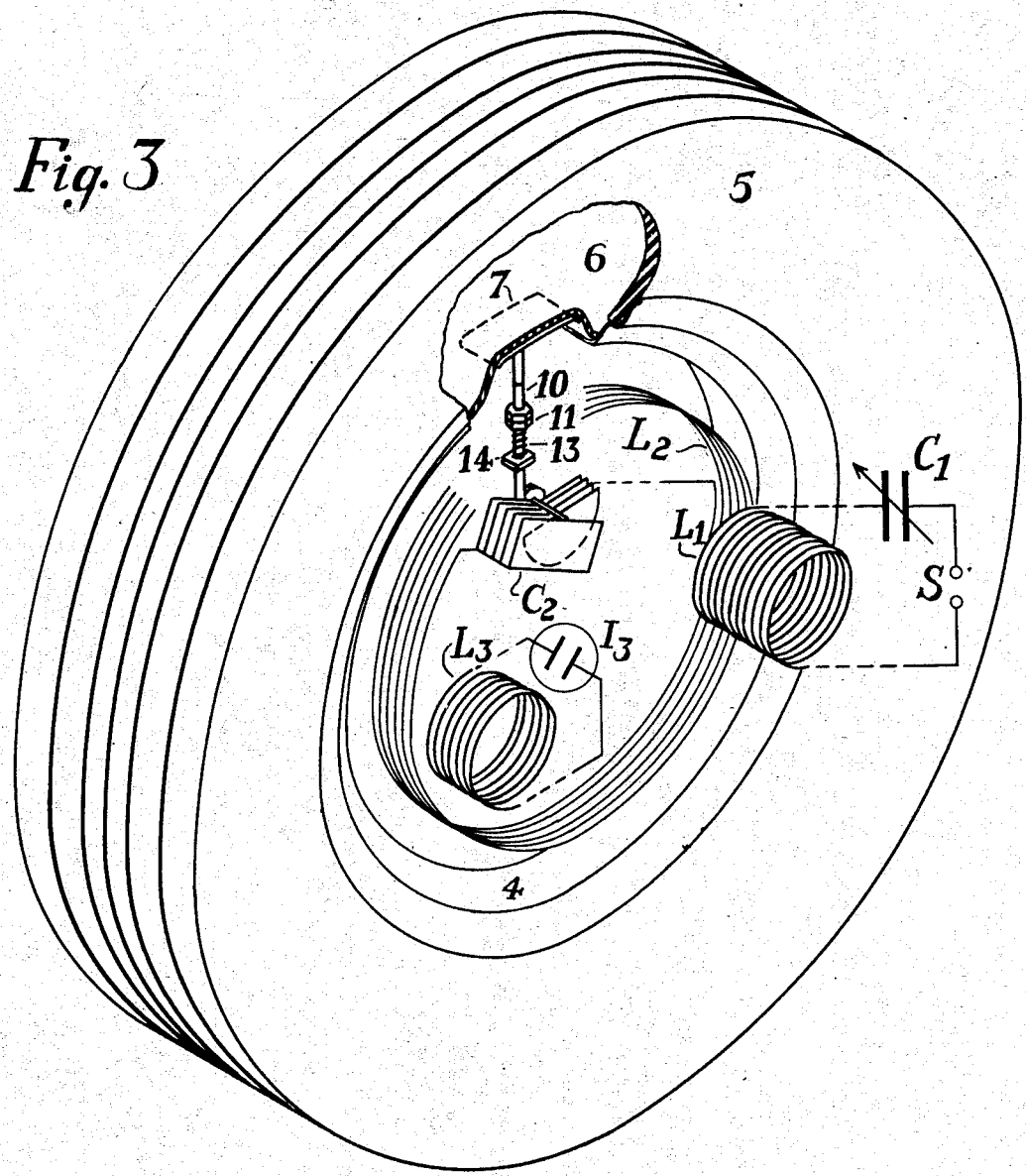

Patented Feb. 24, 1942

2,274,557

UNITED STATES PATENT OFFICE 2,274,557

ELECTRIC GAUGE

Raymond Morgan, Philadelphia, and Rembrandt D. Summers, Rockledge, Pa.

Application July 10, 1940, Serial No. 344,816

2 Claims. (Cl. 177—351)

A principal object of this invention is to provide a relatively simple and practical electric device for gauging conditions which are subject to variations or fluctuations, said device being operative to afford a gauge reading at a point or points remote to immediate area within which the said conditions exist.

A more specific object of the invention is to provide a simple and practical device for gauging the air pressures in the tires of a motor vehicle, said device being operative from the interior of the vehicle and avoiding the necessity for use of the conventional type of pressure gauge.

Another object of the invention is to provide an electrically-operated device of the character described which avoids the necessity for a wired connection between the wheels of the vehicle and the indicator, which as set forth may be located in the interior of the vehicle body.

A preferred embodiment of the invention is illustrated in the attached drawings, in which:

Fig. 3 is a diagrammatic view in sectional perspective illustrating the relation of the various elements of the electrical system and one of the wheels of the motor vehicle.

Figure 1:
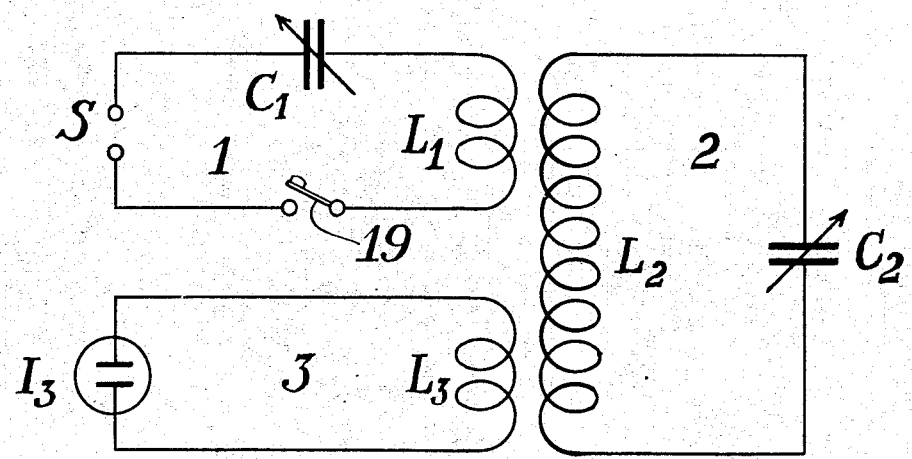
Figure 1 is a diagrammatic view illustrating the essential elements of the electrical circuit or circuits embraced by the device.

As illustrated in Fig. 1, the device comprises an electrical system comprising three separate circuits designated respectively by the reference numerals 1, 2 and 3. The circuit 1 comprises a coil $L_1$, a variable condenser $C_1$, and a spark gap S which may suitably be constituted by one or more of the spark plugs of the internal combustion engine of the motor vehicle. The circuit 1, therefore, constitutes an oscillatory circuit in which electric oscillations are produced by discharges across the gap S, and the frequency of the oscillations in this circuit can be changed by varying the capacitance of the variable condenser $C_1$.

Circuit 2 comprises a coil $L_2$ and a variable condenser $C_2$. The coils $L_1$ and $L_2$ of the circuits 1 and 2 respectively are relatively arranged so that the former is inductively coupled to the latter. The circuit 2, therefore, constitutes also an oscillatory circuit, and the natural frequency of the electric oscillations of this circuit depends largely upon the setting of the variable condenser $C_2$.

Circuit 3 comprises a coil $L_3$ and a gaseous discharge tube $I_3$, and the coil $L_3$ is so relatively arranged with respect to the coils $L_1$ and $L_2$ of the circuits 1 and 2 that the said coil $L_3$ is more closely coupled inductively to the coil $L_2$ than to the coil $L_1$.

It will be apparent that the transfer of energy from circuit 1 to circuit 2 will depend upon the relative frequency conditions of the two circuits, the maximum energy transfer taking place when the frequency of the oscillations in circuit 1 corresponds substantially to the resonant frequency of circuit 2, or in other words when circuit 2 is tuned to resonate at the frequency of the oscillatory circuit 1. Therefore, the tube $I_3$ may be caused to operate in dependence upon the relative frequency conditions of the circuits 1 and 2. By suitable design, the necessary operating voltage for tube $I_3$ appearing across $L_3$ may be made to appear when the energy transfer corresponds to some particular frequency relation of the circuits other than a tuned condition of the two circuits, or the design may be such that the necessary voltage to operate tube $I_3$ will appear across $L_3$ only when the two circuits are substantially tuned relative to one another. Preferably the latter design should be employed. The design of the system will, of course, depend on the nature of tube $I_3$, the number of turns in the coils, the degree of coupling, etc.

Figure 2:
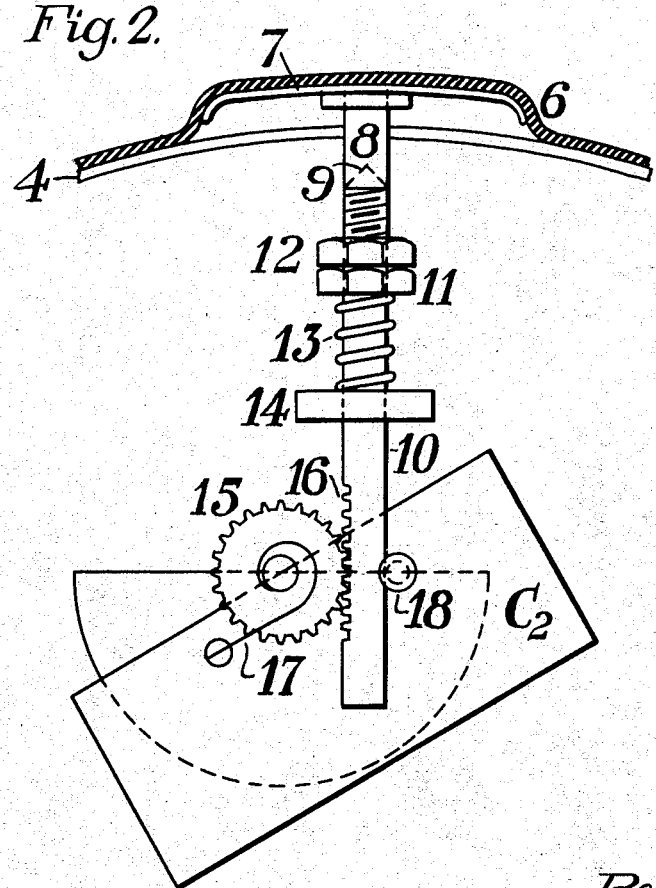
Fig. 2 is a diagrammatic view illustrating one form of mechanical connection between one of the tires and the electrical system.

In accordance with our invention, the coil $L_2$ of the circuit 2 is mounted coaxially upon one of the wheels of the motor vehicle, as illustrated diagrammatically in Fig. 3, wherein the reference numeral 4 indicates the rim of the wheel, 5 the tire casing, and 6 the inner tube. The variable condenser $C_2$, also mounted upon the wheel, is mechanically connected with the inner tube 6 so that the setting of the condenser, and hence the natural frequency of the electric oscillations in the circuit 2, is controlled by the amount of air pressure in the tire. This mechanical connection is best illustrated in Fig. 2, and comprises a plate 7 which bears against the inner tube 6 and which is supported on a plunger 8 which passes slidably through an aperture in the rim 4 and seats at 9 upon the end of a rod 10. The rod 10 is threaded for reception of a nut 11 and a lock nut 12, the first of these nuts constituting a seat for a coiled spring 13 which embraces the rod 10 and which seats at its opposite end against a fixed stop 14 which is rigidly fixed to the wheel structure. The spring 13 thereby functions to exert a longitudinal pressure upon the rod 10, and through the plunger 8 exerts pressure forcing the plate 7 against the wall of the inner tube 6. The amount of this pressure may be varied by adjustment of the nut 11 and lock nut 12.

Carried by the shaft of the variable condenser $C_2$ is a toothed wheel 15 which engages a rack 16 on the rod 10, and the rod 10 is held in operative engagement with the toothed wheel 15 by the stop 14 through an aperture in which the rod 10 extends and by a guide 18 on the fixed body of the condenser. A spring 17 attached to the body of the condenser and to the sprocket 15 or to the condenser shaft serves to take up lost motion between the rack 16 and the toothed wheel 15. By means of the aforedescribed mechanical connection, it will be apparent that the setting of the condenser $C_2$ is determined directly by the extent to which the inner tube 6 is inflated, or in other words, by the amount of air pressure in the tube.

The coil $L_1$ is mounted on the chassis of the automobile and, as previously set forth, in such position as to be inductively coupled to the coil $L_2$. The variable condenser $C_1$ of the circuit may be mounted at any suitable point for manual operation within the body of the motor vehicle, such, for example, as on the dashboard, and the dial of this condenser is preferably calibrated in numbers to correspond to pounds per square inch of air pressure in the tire tube 6.

The coil $L_3$ is also mounted on the chassis of the motor vehicle and, as previously set forth, in such position as to be more closely coupled inductively to the coil $L_2$ than to the coil $L_1$. The tube $I_3$ of the circuit 3 may be mounted at any suitable point within the body of the motor vehicle, preferably at the dashboard.

The frequency $f_1$ of electric oscillations in the circuit 1, which is determined by the manual setting of condenser $C_1$, will be approximately the frequency given by the relation $$f_1 = \frac{1}{2\pi\sqrt{L_1 C_1}}$$

Similarly, the natural frequency $f_2$ of the circuit 2, which is determined by the above-mentioned adjustment of condenser $C_2$ will be approximately the frequency given by the relation $$f_2 = \frac{1}{2\pi\sqrt{L_2 C_2}}$$

The coils $L_1$ and $L_2$ and condensers $C_1$ and $C_2$ are so designed that the value of the frequency $f_1$ can be made approximately equal to the value of the frequency $f_2$ by manually varying the condenser $C_1$. If then the setting of the condenser $C_1$ be adjusted so that a discharge occurs in the tube $I_3$, the reading of the setting on the condenser $C_1$ will give directly the air pressure in the tire tube 6.

It will be apparent that in the aforedescribed device, the circuit 1 constitutes in effect a source of electric oscillations whose frequency may be manually controlled. In the specific embodiment of the invention described, this circuit is energized, as a matter of convenience, from the ignition system of a motor vehicle, but obviously the circuit may be energized from any suitable source without affecting the operation of the device as a whole. The circuit 2 constitutes in effect a transfer means which receives electric energy from the circuit 1 and transfers this energy to the circuit 3, and the resonant frequency of the circuit 2, through the variable condenser $C_2$, is directly controlled, in the present instance, by the variable pressure condition in the inner tube of a vehicle tire. The circuit 3 constitutes an indicating means which is operative only when the frequency characteristics of the circuits 1 and 2 have a predetermined relation.

In the particular embodiment described, the resonant frequency of the circuit 1 is selectively controllable through the variable condenser $C_1$, but it will be apparent that for certain purposes, the resonant frequency of this circuit may be a definitely established one, in which case the indicating means represented by the circuit 3 would operate when and only when the resonant frequency of the circuit 2, through the medium of the variable condenser $C_2$, is brought into the aforesaid predetermined relationship with the established resonant frequency of the circuit 1. Under these latter circumstances, operation of the indicating means would indicate a certain specific condition of pressure in the tire tube. It is apparent also that substantially the same result might be obtained by designing the circuits 1 and 2 so that they have a predetermined frequency relation, i. e., using fixed condensers, and by arranging in circuit 2 a normally-open switch arranged to be closed when the tire tube reaches a given condition of deflation. Neither of the two last described modifications is considered practical in the particular application of the device herein described, namely, as a motor vehicle tire gauge, but it is believed obvious that such modifications might constitute a desirable form of the device for gauging other variable conditions, and primarily as a means for signalling that a certain critical condition has been attained or is being maintained.

It will be understood that in the application of the device to a motor vehicle tire gauge, there will, preferably, be one of the aforedescribed electrical systems associated with each of the vehicle wheels or tires, and that the said systems will then operate independently to gauge the pressures in the respective tires with which they are individually associated. The circuit 1 is provided with a normally open switch 19, which when closed actuates the device as described above.

Figure 4:
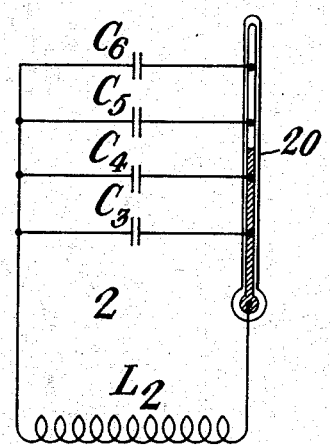
Fig. 4 is a diagrammatic view illustrating a modification within the scope of the invention.

The modification of the device shown in Fig. 4 is adapted primarily for gauging the temperature of a tire. In this case, the resonant frequency of the circuit 2 is varied through the medium of a plurality of fixed condensers $C_3$, $C_4$, $C_5$ and $C_6$, and a thermometer 20 which is arranged in thermal relation with the tire or tire tube. The circuit includes the mercury or other electrically conductive medium which constitutes the active element of the thermometer, and as the temperature increases, the condensers are successively connected in the circuit by the rising column in the thermometer in obvious manner. The approximate temperature of the tire may be determined by manipulation of the condenser $C_1$ of the circuit 1, the dial of which in this case is calibrated in terms of degrees of temperature.

A plurality of fixed condensers, as described above, may also be substituted for the variable condenser $C_2$ in the pressure gauge embodiment previously described. In such case, the rack and pinion device shown in Fig. 2 would be replaced by a sliding electric contact which would vary the number of the fixed condensers connected in the circuit in accordance with the variations of pressure in the tire. Similarly, a plurality of fixed condensers, with suitable means for varying the number of the condensers connected in the circuit, might be used instead of the variable condenser $C_1$ of circuit 1. Fixed condensers would have the advantages over the variable condensers of being more easily insulated at the relatively high voltages used; of requiring fewer, simpler and lighter control parts; and of being more compact.

We claim:

1. In electrical means for measuring some variable condition in a rotating member, a relatively stationary aperiodic circuit containing an indicating device responsive to changes in voltage in said circuit, an energizing circuit relatively fixed with respect to said aperiodic circuit, a tuned circuit on said rotating member forming a coupling between said energizing and indicating circuits, the indicating circuit having negligible direct coupling with the energizing circuit and thereby being inoperative except for the aforesaid coupling through the tuned circuit on the rotating member, and means for modifying the resonant frequency of the said tuned circuit in accordance with variations in the said condition in the rotating member.

2. In combination, an internal combustion engine comprising electrical ignition means, a rotary driven member, and means for measuring some variable condition in said member, said means comprising an oscillating circuit energized solely from a spark source in said ignition system, a work circuit, a tuned circuit on said rotary member forming a coupling between said oscillating and work circuits, said work circuit having negligible direct coupling with the oscillating circuit and thereby being inoperative except for the aforesaid coupling through the tuned circuit on the rotary member, and means for modifying the resonant frequency of the said tuned circuit in accordance with variations in said condition in the rotary member.

RAYMOND MORGAN.
REMBRANDT D. SUMMERS.